(12) United States Patent
Niedermeyer

(10) Patent No.: US 6,712,553 B1
(45) Date of Patent: Mar. 30, 2004

(54) GRID DRAIN SYSTEM

(76) Inventor: Karl O. Niedermeyer, 17W068 North St., Bensenville, IL (US) 60106

( * ) Notice: Subject to any disclaimer, the term of this patent is extended or adjusted under 35 U.S.C. 154(b) by 0 days.

(21) Appl. No.: 10/080,900

(22) Filed: Feb. 22, 2002

(51) Int. Cl.[7] ................................................. E02B 11/00
(52) U.S. Cl. ....................................... 405/41; 52/169.5
(58) Field of Search ........................... 405/40, 41, 42, 405/43, 44, 46; 52/169.5

(56) References Cited

U.S. PATENT DOCUMENTS

| | | | | |
|---|---|---|---|---|
| 4,919,343 A | * | 4/1990 | Van Luik et al. | 241/36 |
| 4,927,292 A | * | 5/1990 | Justice | 405/43 |
| 4,992,030 A | * | 2/1991 | Hasslen, III | 417/360 |
| 5,059,064 A | * | 10/1991 | Justice | 405/37 |
| 6,059,208 A | * | 5/2000 | Struthers | 241/46.01 |

* cited by examiner

Primary Examiner—Heather Shackelford
Assistant Examiner—Lisa Saldano
(74) Attorney, Agent, or Firm—Barnes & Thornburg

(57) ABSTRACT

A pitless drainage system for removing water from the footings of a structure. A vertical riser is located outside the structure, extending from above the ground to a subterranean location proximate a footing drain. A well collector extends downwardly from the vertical riser, having a series of ingress slots to allow water to flow therethrough. A submergible torpedo pump is located in the well collector, and upper and lower pump activation controls deactivate and activate the pump depending on the water level in the vertical riser. A over level pump activation is provided, as well, in case the upper level pump activation fails.

12 Claims, 3 Drawing Sheets

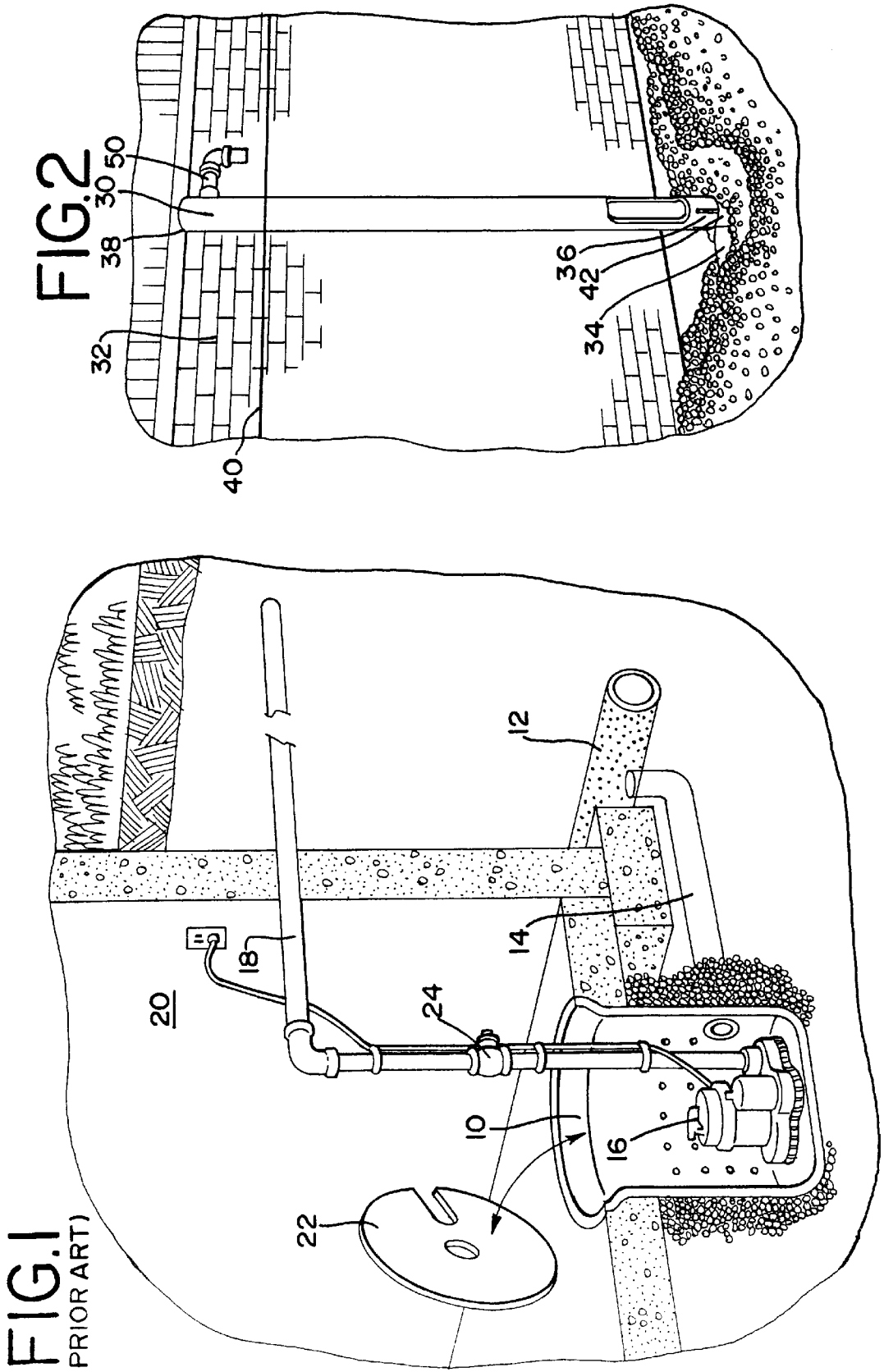

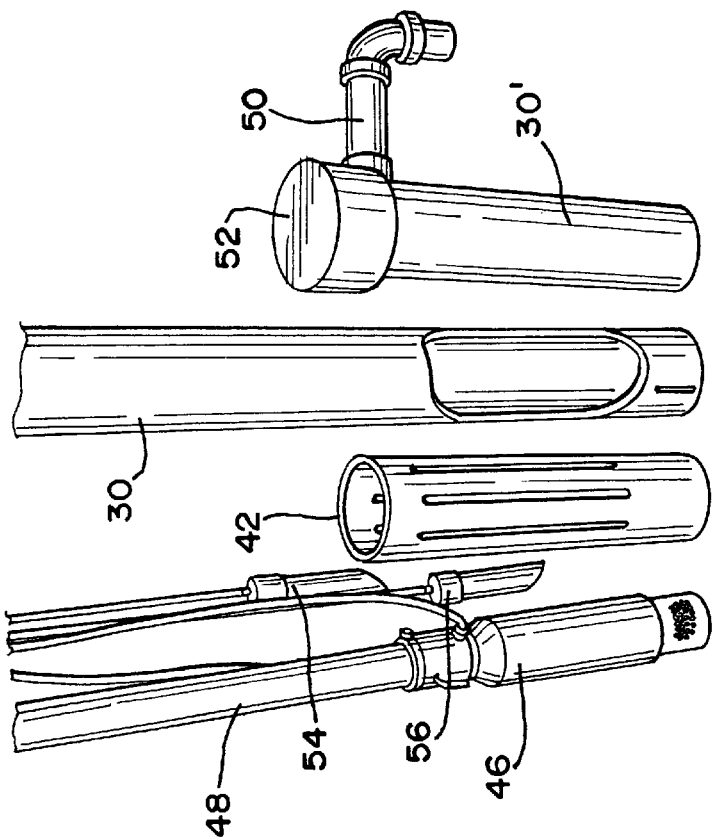
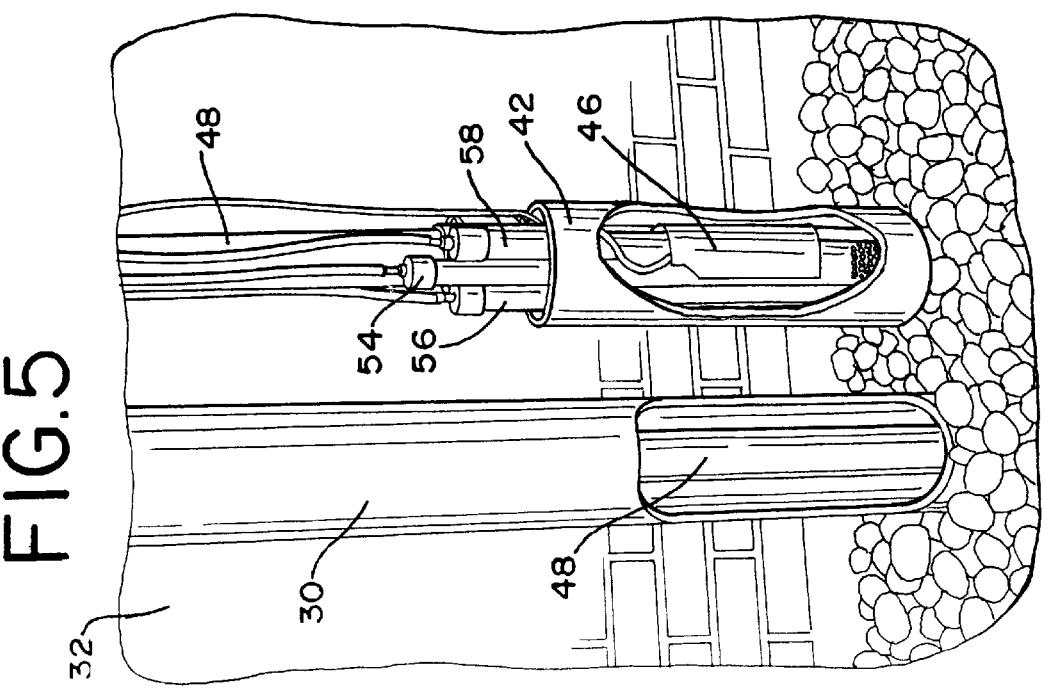

GRID DRAIN SYSTEM

BACKGROUND OF THE INVENTION

This invention relates to grid drain systems, and in particular to a pitless drainage system for removing water from at least a portion of a footing drain in which water is collected at a subterranean location.

Typical sump pump systems include an interior sump pit within the walls of a structure. U.S. Pat. Nos. 4,631,001 and 5,314,313 depict such systems. Footings of the building in which the sump system is located drain to the interior sump pit, and when water within the sump pit reaches a particular level, a sump pump is activated and water is pumped out of the structure. Such systems have been in use for decades.

Many problems exist with typical sump systems. Since the sump pit is located inside the structure, if the sump pump fails or becomes overwhelmed, the interior of the structure can become flooded. Also, because the sump pit is located inside the structure, a certain portion of the interior space of the structure must be reserved for the sump pit and related equipment. Furthermore, since pumping occurs from inside the building to outside the building, any valve failures can also result in flooding of the interior of the structure. Finally, because water is located exterior to the structure, current systems are inherently inefficiently designed, allowing water to enter the structure, and then requiring the water to be pumped outside again.

U.S. Pat. No. 4,298,294 discloses a system for lowering the water level about a structure by using an exterior wet well. While such a structure can be advantageous, particularly in very pervious soil systems, a disadvantage is that for larger structures, two or more of the systems of this patent might be required to provide proper dewatering. Also, the system requires a fairly large diameter bore, similar to the typical interior sump pit, but sunk to a considerable depth below the ground surface.

SUMMARY OF THE INVENTION

The invention overcomes the above deficiencies of the prior art and others, by providing a pitless drainage system for removing water from at least a portion of a footing drain in which water is collected at a subterranean location. The system includes a vertical riser extending from a top at an upper elevation above ground to a bottom at a lower elevation at the subterranean location. The riser is located proximate footing drains around the structure. A well collector is located in the vertical riser at the bottom, the well collector having ingresses allowing water to flow therethrough. A protective cap is secured at the top of the riser. A submersible pump extends down the riser into the well collector, and a water level pump activation and a lower level pump activation.

In accordance with the preferred form of the invention, the vertical riser comprises a pipe, which preferably is made of plastic or other impervious material. Metal can also be used, but is not as versatile, and, depending on the type of metal, could be subject to corrosion.

The well collector preferably comprises an extended portion of the pipe. It can be either an integral portion of the pipe, or a separate element secured to the pipe. The ingresses comprise elongated vertical slots in the well collector, the slots being sized so that exterior material, such as soil and gravel, cannot easily enter the well collector.

The cap comprises a cover which is attached to the top of the vertical riser. Preferably, the cover is removable for ready access to the submersible pump and upper and lower level pump activations.

The upper and lower pump activations comprise pressure sensor tubes. Preferably, an over level pump activation is included, as well. The over level pump activation also comprises a pressure sensor tube.

The pitless drainage system extends down to a subterranean location beneath the footing drain, so that water from the footing drain can readily be removed. Preferably, gravel or relatively large rock is installed in the vicinity of the well collector to promote free flow of water into the well collector.

BRIEF DESCRIPTION OF THE DRAWINGS

The invention is described in greater detail in the following description of an example embodying the best mote of the invention, taken in conjunction with the drawing figures, in which:

FIG. 1 depicts a typical prior art sump pump system,

FIG. 2 is an elevational view of a pitless drainage system according to the invention, showing the vertical riser and footing drain, FIG. 5 is an elevational view of the bottom portion of the vertical riser, again having a portion cut away to show detail and illustrating the submersible pump therein, and having next to the vertical riser a removed well collector having a cutaway portion and illustrating how the submersible pump and pump activation sensors are located therein, and FIG. 6 is an elevational illustration of various portions of the pitless drainage system according to the invention when taken apart and shown one next to the other.

DESCRIPTION OF AN EXAMPLE EMBODYING THE BEST MODE OF THE INVENTION

Figure 4:
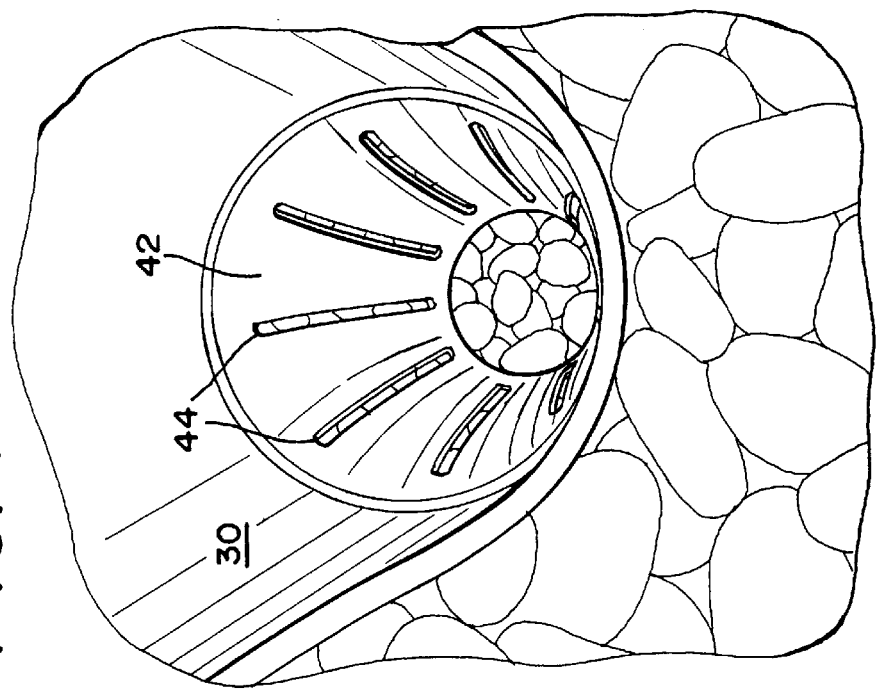
FIG. 4 is a further enlarged view of the vertical riser illustrated in FIG. 3, better showing the well collector.

A typical prior art sump pump system is illustrated in FIG. 1. The typical system includes a sump pit 10 which is connected to an exterior footing drain 12 by a lateral conduit 14. Water collects in the sump pit 10, and is periodically removed by a sump pump 16 to an appropriate exterior location via a conduit 18 extending back through the wall 20 of the building in which the sump pit 10 is located. As illustrated, the sump pit 10 is open to the interior of the building in which it is located, and may include a lid 22 to partially cover the opening of the sump pit 10.

Such an arrangement, while effective so long as the sump pump 16 is functional and not overwhelmed by the quantity of incoming water, still suffers many drawbacks. Because the sump pit 10 is located inside a structure, in areas where radon is a concern, the sump pit 10 is an undesired source of radon gas. Also, because the sump pit 10 is inside the building, a portion of the space within the building must be reserved for the sump pit and its piping, electrical connections, and any backup equipment (not illustrated) that might be present. Also, because of the interior location, should any of the exit conduit 18 or its check valve 24 fail, even if the sump pump 16 is functioning properly, the building interior can be damaged. Additionally, should the sump pump 16 fail and there be no back up for it, the sump pit 10 is essentially an opening to water pressure on the outside of the wall 20, providing a simple source of flooding within the structure. Finally, because of the location within the building, noise is a constant concern even with the lid 22.

The grid drain system according to the invention eliminates all of the deficiencies of prior art systems. As shown in FIGS. 2 through 6, the grid drainage system includes a vertical riser 30, installed on the exterior side of a foundation wall 32. The vertical riser 30 preferably is a plastic pipe, and maybe made in sections if necessary, depending on its length.

Figure 3:
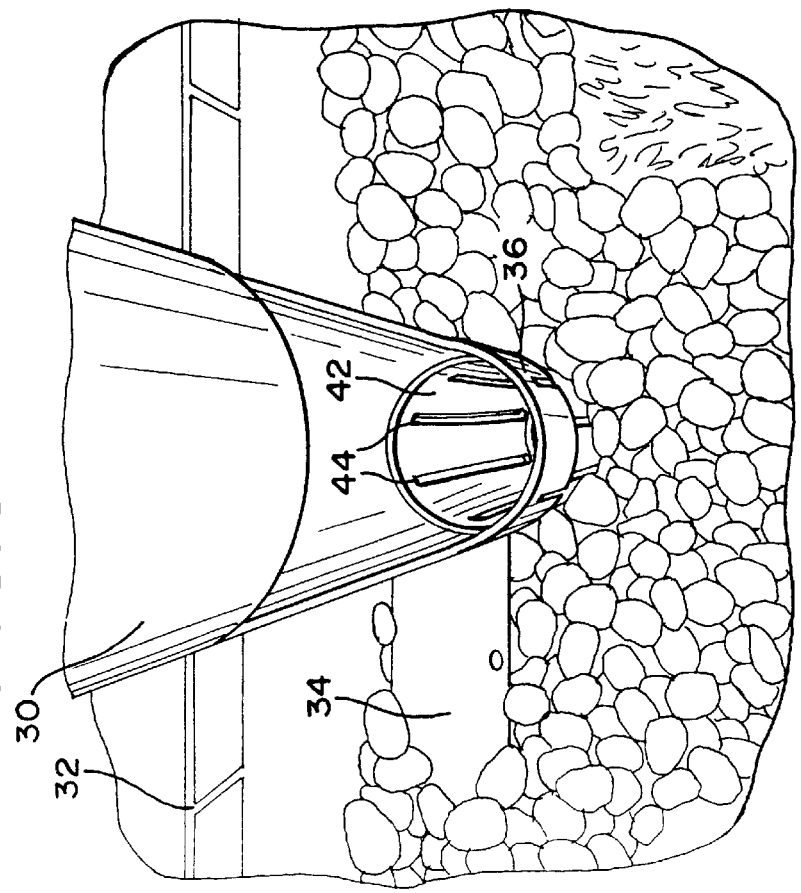
FIG. 3 is an enlarged view of the bottom portion of the vertical riser illustrated in FIG. 2, showing the bottom portion thereof and footing drain in greater detail, and having a portion cut away to show the interior.

A footing drain 34 extends about the foundation wall 32 in a conventional fashion. The footing drain 34 allows ingress of water in a conventional fashion, but unlike prior drainage systems as shown in FIG. 1, the footing drain 34 includes no connection to the interior of the building supported by the foundation wall 32. Instead, as illustrated in FIGS. 2 and 3, the vertical riser extends immediately adjacent to the footing drain 34, from a bottom 36 at a lower elevation at the same subterranean location of the footing drain 34 to a top 38 at an upper elevation above ground level 40.

The vertical raiser 30 is shown with an opening proximate the bottom 36. That is just for illustration purposes, however, and in use, the vertical riser 30 is impervious from top to bottom. At the bottom 36, a well collector 42 extends downwardly adjacent and beneath the footing drain 34. The well collector 42 can be an integral extension of the vertical riser 30 or, as illustrated, can be a separate conduit that is glued, welded or otherwise appropriately affixed to the vertical riser 30.

The well collector 42 allows ingress of water, and has a series of spaced, vertical slots 44. The slots 44 are sized, in combination with surrounding fill, so that only water will flow into the interior of the well collector 42.

When the pitless drainage system according to the invention is assembled, a submersible pump 46 is inserted down the vertical riser 30, within the well collector 42. The submersible pump 46 can be a conventional torpedo pump, or any other similar type of pump that can be suspended within and fit within the small space of the well collector 42 of the vertical riser 30. The submersible pump 46 is connected to a conduit 48 which extends within the vertical riser 30 to a lateral conduit 50 which can lead to a sewer, slotted drainage pipe, or other means of disposing of water drawn from the well collector 42.

A protective cap 52 is provided atop the vertical riser 30. The cap comprises a cover, which preferable is removable to gain access to the interior of the vertical riser, both for accessing the submersible pump 46 and the conduit 48, as well as other components that are located therein.

Water level within the vertical riser is controlled by means of an upper level pump activation sensor tube 54 and a lower level pump activation sensor tube 56. The sensor tube 54 is located at a higher elevation and detects an upper level of water within the vertical riser 30, at which time the submersible pump 46 is activated. The sensor tube 56 is located at a lower elevation and detects a lower level, at which time operation of the submersible pump 46 is ceased. The upper and lower level pump activation sensor tubes 54 and 56 extend to a control (not illustrated) which then activates the submersible pump 46 in a conventional manner. Also, an over level pump activation sensor tube 58 is preferably included, utilized as a backup so that if, for any reason, the upper level sensor tube 54 fails to activate the submersible pump 46, rising of the water level to a further, higher level will activate the pump 46 via the over level pump actuation sensor tube 58. The sensor tube 58 could also activate a high water alarm or activate a separate back-up pump (both not illustrated).

In FIG. 5, the sensor tubes 54, 56 and 58 are shown clustered about or above the submersible pump 46 within the well collector 42. This is for illustration purposes, only. When deployed, the sensor tube 56 is located at a lower level within the well collector 42, representing the lowest water level to be reached before the submersible pump 46 turns off. The sensor tube 54 is located at a higher elevation in the well collector 42 or vertical riser 30, representing the location at which water can rise before the submersible pump 46 is activated. The sensor tube 58 is located at a higher elevation than the sensor tube 54, just in case the sensor tube 54 does not activate the submersible pump 46. The elevations of the sensor tubes 54, 56 and 58 within the vertical riser 30 and the well collector 42 can readily be adjusted, access and adjustment being by means of removal of the cap 52. Therefore, the installer or owner can easily adjust the activation levels for the submersible pump 46.

The elements of the grid drain system according to the invention are shown in FIG. 6, with the exception of the footing drain 34. The vertical riser 30 is shown in two parts, with an upper portion 30' separate from the main portion of the vertical riser 30. As explained above, the vertical riser 30 can be made in sections, or not, as desired. That shown in FIG. 6 is only for purposes of illustration and not for limitation.

For purposes of access, at least the top 38 of the vertical riser 30 extends above ground level 40. While a generous portion of the vertical riser 30 is shown above ground level 40, that can actually be reduced and the lateral conduit 50 can be buried, as well. The grid drain system according to the invention is highly flexible, and installation can be such that although the top 38 of the vertical riser 30 remain accessible, it can be largely hidden from view.

The invention solves all the problems of prior art sump pit systems and provides a far more reliable system for draining the periphery of a structure without ever penetrating the foundation walls thereof. Various changes can be made to the invention without departing from the spirit thereof or scope of the following claims.

What is claimed is:

1. A pitless drainage system for removing water from at least a portion of a footing drain in which water is collected at a subterranean location, said system comprising:
   a. a vertical riser extending in a substantially vertical orientation from a top at an upper elevation above ground to a bottom at a lower elevation at the subterranean location, the riser being located proximate the footing drain,
   b. a well collector in the vertical riser at the bottom, the well collector having ingresses allowing water to follow therethrough,
   c. a protective cap on the riser at the top,
   d. a submersible pump in the well collector, and
   e. water level control in the vertical riser, comprising
      i. an upper level pump activation repositionable within the vertical riser, and
      ii. a lower level pump activation repositionable within the vertical riser.

2. The pitless drainage system according to claim 1, in which said riser comprises a pipe.

3. The pitless drainage system according to claim 2, in which said pipe is plastic.

4. The pitless drainage system according to claim 2, in which said well collector comprises an extended portion of said pipe.

5. The pitless drainage system according to claim 1, in which said ingresses comprise elongated vertical slots in said well collector.

6. The pitless drainage system according to claim 1, in which said cap comprises a cover attached to said top.

7. The pitless drainage system according to claim 6, in which said cover is removable.

8. The pitless drainage system according to claim 1, in which said upper and lower pump activations comprise pressure sensor tubes.

9. The pitless drainage system according to claim 1, including an over level pump activation.

10. The pitless drainage system according to claim 9, in which said over level pump activation comprises a pressure sensor tube.

11. The pitless drainage system according to claim 1, in which said well collector extends to a depth beneath the footing drain.

12. A pitless drainage system for removing water from at least a portion of a footing drain in which water is collected at a subterranean location, said system comprising:
   a. a tubular vertical riser extending in a substantially vertical orientation from an upper location above ground to a lower location proximate the footing drain at said subterranean location,
   b. a well collector extending from the vertical riser, the well collector having ingresses for water comprising elongated, space vertical slots,
   c. a removable protective cap secured atop the vertical riser,
   d. a submersible pump in the well collector, and
   e. water level control in the vertical riser, comprising
      i. an upper level pump activation sensor tube repositionable within the vertical riser,
      ii. a lower level pump activation sensor tube repositionable within the vertical riser, and
      iii. an over level pump activation sensor tube.

* * * * *